(12) United States Patent
Lyon

(10) Patent No.: US 8,183,827 B2
(45) Date of Patent: May 22, 2012

(54) ADAPTIVE CHARGER SYSTEM AND METHOD

(75) Inventor: Geoff M. Lyon, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/353,540

(22) Filed: Jan. 28, 2003

(65) Prior Publication Data
US 2004/0145342 A1 Jul. 29, 2004

(51) Int. Cl.
*H02J 7/00* (2006.01)
(52) U.S. Cl. .................... 320/108; 320/106
(58) Field of Classification Search ............ 320/108, 320/107, 109, 139, 106; 336/DIG. 2
See application file for complete search history.

(56) References Cited

U.S. PATENT DOCUMENTS

| | | | |
|---|---|---|---|
| 3,938,018 A * | 2/1976 | Dahl | 320/140 |
| 5,734,254 A * | 3/1998 | Stephens | 320/106 |
| 6,057,668 A | 5/2000 | Chao | |
| 6,122,329 A * | 9/2000 | Zai et al. | 375/329 |
| 6,154,005 A | 11/2000 | Hyogo et al. | |
| 6,184,651 B1 * | 2/2001 | Fernandez et al. | 320/108 |
| 6,281,683 B1 * | 8/2001 | Podrazhansky et al. | 324/432 |
| 6,345,203 B1 * | 2/2002 | Mueller et al. | 607/60 |
| 6,400,274 B1 * | 6/2002 | Duan et al. | 340/572.7 |

FOREIGN PATENT DOCUMENTS
JP 08-237890 A 9/1996
JP 10-233235 A 9/1998

OTHER PUBLICATIONS

Machine translation of JP-H08-237890 -A.*
Machine translation of JP-H10-233235-A.*

* cited by examiner

*Primary Examiner* — Edward Tso

(57) ABSTRACT

A method and apparatus is used for adaptive inductive charging of a device. Charging includes detecting the presence of a device capable of receiving an inductive charge, determining a set of parameters for inductively charging the device, and transmitting an inductive charge corresponding to the set of parameters for charging the device. Another aspect of charging includes combining at least two inductive fields transmitted at different angles to each other, delivering the combined inductive field at an orientation to the device, measuring the load on the device to determine the effectiveness of the orientation of the inductive field when charging the device, and charging the device at the orientation of the inductive field when the measured load on the device exceeds a threshold load level.

26 Claims, 5 Drawing Sheets

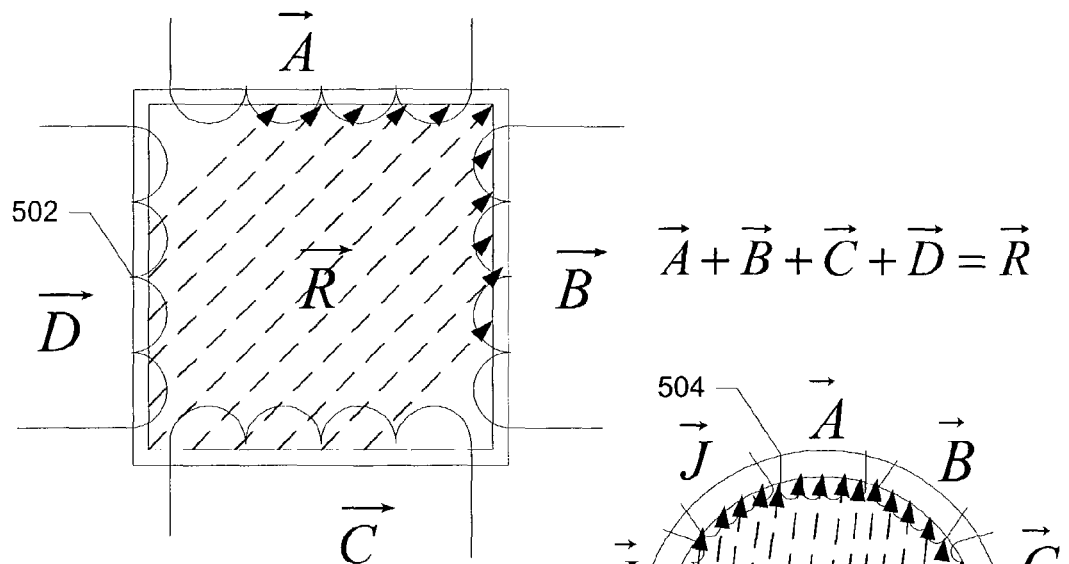
$$\vec{A}+\vec{B}+\vec{C}+\vec{D}=\vec{R}$$
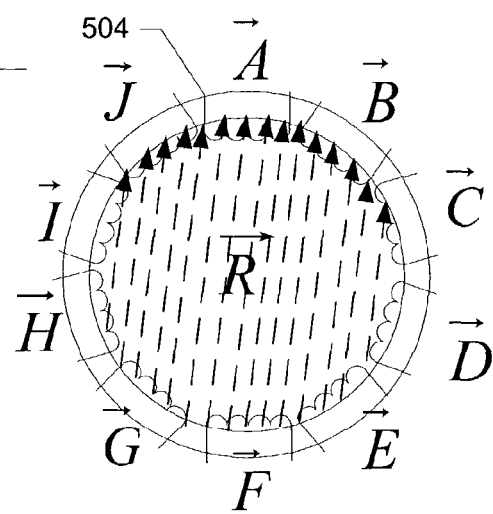
FIG. 5
$$\vec{A}+\vec{B}+\vec{C}+\vec{D}+\vec{E}+\vec{F}+\vec{G}+\vec{H}+\vec{I}+\vec{J}=\vec{R}$$
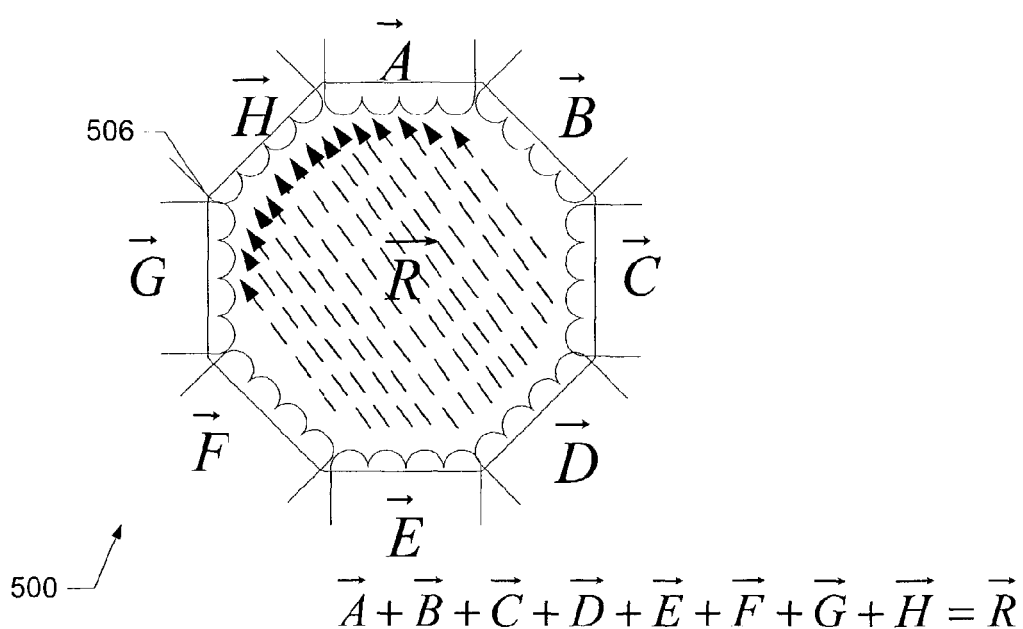
$$\vec{A}+\vec{B}+\vec{C}+\vec{D}+\vec{E}+\vec{F}+\vec{G}+\vec{H}=\vec{R}$$

ADAPTIVE CHARGER SYSTEM AND METHOD

BACKGROUND OF THE INVENTION

The present invention relates to transmitting a charge to a device using inductive coils. Portable devices need a source of energy for operation. Generally, a rechargeable battery located within the device serves to power the device for a reasonable usage period and is then recharged during the evening or when the device is no longer in use. Users may effectively use these devices (i.e., phones, personal digital assistants, portable computers, diagnostic equipment) without running out of energy if the battery capacity is large enough and regularly charged in the battery charger.

Generally, a separate charger is provided with each portable device designed to meet the charging requirements of the battery and shape of the particular device. Unfortunately, the number of charging devices becomes unwieldy as the number of portable devices used by consumers and professionals continues to grow. Each charger requires a separate physical power source or wall-socket to supply the charge; wall-sockets are sometimes in limited supply in hotels, offices, or small apartments. Moreover, professionals traveling from home, to work, and to remote locations must also carry with them the appropriate chargers for each of the portable devices they use and rely upon.

Even if carrying these chargers were feasible, conventional chargers are sometimes problematic to use. Fixed wire cables or charging cradles used to charge some devices may lack sufficient mechanical and/or electrical contact with the device as the contacts on the cables or charging cradles wear out over time. This decrease in reliability of the charging device can negatively affect the user experience and also be costly for the manufacturer to repair and maintain through a warranty period.

Using fixed inductive couplings between the charger and the portable device addresses some but not all of the above failings. These chargers do not have mechanical or electrical contact with the device so are less prone to mechanical or electrical failures. They are also useful in situations where a conventional electrical contact would be dangerous in the particular environment (i.e., pacemakers embedded within the body or toothbrushes exposed to water during brushing). Nonetheless, even conventional inductive chargers require good positional matching between the shape of the charger and the device being charged. Consequently, portable devices charged inductively still require having multiple corresponding chargers uniquely designed for the particular battery being charged and device shape. These electrical, mechanical, and positional requirements for the inductive chargers may also restrict or compromise the design styling of the devices being charged.

SUMMARY OF THE INVENTION

One aspect of the invention features adaptive inductive charging of a device. Charging includes detecting the presence of a device capable of receiving an inductive charge, determining a set of parameters for charging the device through induction, and transmitting an inductive charge corresponding to the set of parameters for charging the device.

Another aspect of the invention describes charging a device through mutual inductance. In this aspect of the invention, charging includes combining at least two inductive fields transmitted at different angles to each other, delivering the combined inductive field at an orientation to the device, measuring the load on the device to determine the effectiveness of the orientation of the inductive field when charging the device, and charging the device at the orientation of the inductive field when the measured load on the device exceeds a threshold load level.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 5 is a block diagram illustrating various geometric configurations for arranging inductive coils in accordance with implementations of the present invention.

DETAILED DESCRIPTION

Aspects of the present invention are advantageous in at least one or more of the following ways. An inductive charger device designed in accordance with the present invention can be used to charge multiple different portable devices. The charger device identifies the presence of one or more devices on the charger plate and determines the appropriate parameters for charging each of the devices including the orientation, strength, phase, amplitude, and frequency of the magnetic inductive field. Multiple devices placed on the charger device each automatically receive an inductive field oriented to efficiently charge each device. The proper orientation of the magnetic field improves mutual magnetic coupling between the charger and device necessary for charging.

Implementations of the present invention are also advantageous as compatible devices can communicate charge levels and other information over a bi-directional channel to improve charging efficiency and automate operation of the charger. The bi-directional channel can be carried over the charging channel to communicate this information without the added costs of adding a separate dedicated data channel. In general, the inductive charger designed in accordance with the present invention not only accommodates multiple different devices automatically but also obviates the need to have an individual charger for each inductively charged device.

Figure 1:
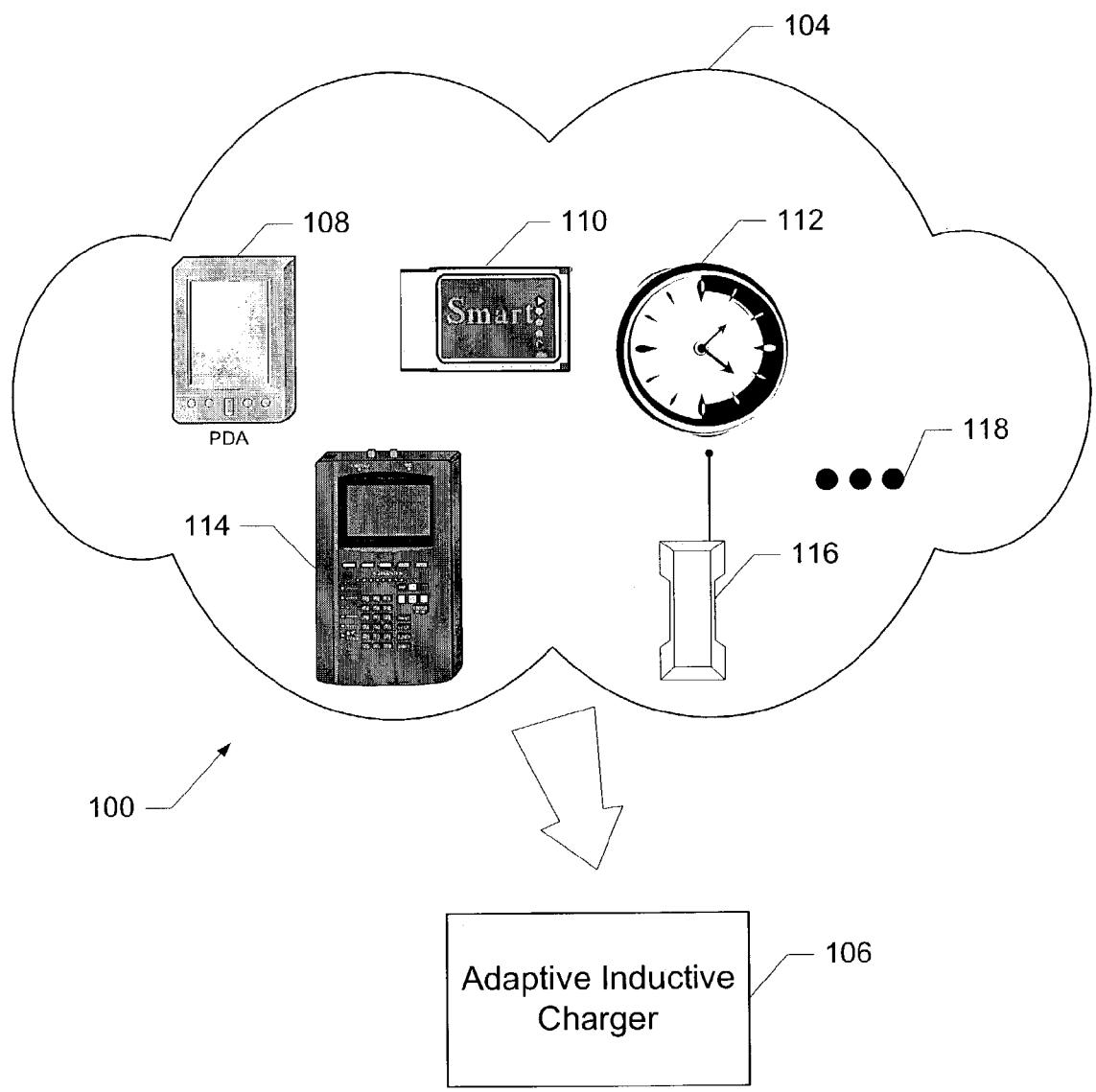
FIG. 1 is a block diagram depicting a set of devices and an adaptive inductive charger designed in accordance with one implementation of the present invention.

FIG. 1 is a block diagram depicting a set of devices 104 and an adaptive inductive charger 106, hereinafter inductive charger 106, designed in accordance with one implementation of the present invention. Inductive charger 106 is capable of charging one or more devices 104 simultaneously or in series depending on the options selected for charging. Devices 104 can include, for example, a personal digital assistant (PDA) 108, smart device/card 110, timer devices 112, instruments 114, telephony devices 116, and other devices 118 that receives an inductive charge.

In operation, a user places one or more of devices 104 on the surface of inductive charger 106. The surface of inductive charger 106 accommodates different shapes, sizes, and orientations of devices 104 and does not have a specific surface for receiving one device in particular. Instead, inductive charger 106 operates multiple inductive coils in accordance with implementations of the present invention to present each of the one or more devices with the proper magnetic field to charge each device. In one implementation, inductive charger 106 can charge devices 104 in a round-robin scheme that incrementally charges each of the devices on the platter using a magnetic field best suited for each device. Inductive charger 106 sequences through devices 104 providing each device a charge for a fixed or variable time period before switching to and charging another device.

Alternatively, inductive charger 106 charges each device in devices 104 sequentially in their entirety in a first-in-first-out (FIFO) sequence. In this latter approach, the first device placed on inductive charger 106 may be charged more quickly as it would not stop receiving the inductive charge until it was fully charged. Other devices subsequently placed on inductive charger 106 would be delayed by the time it takes to completely charge the preceding devices.

Figure 2:
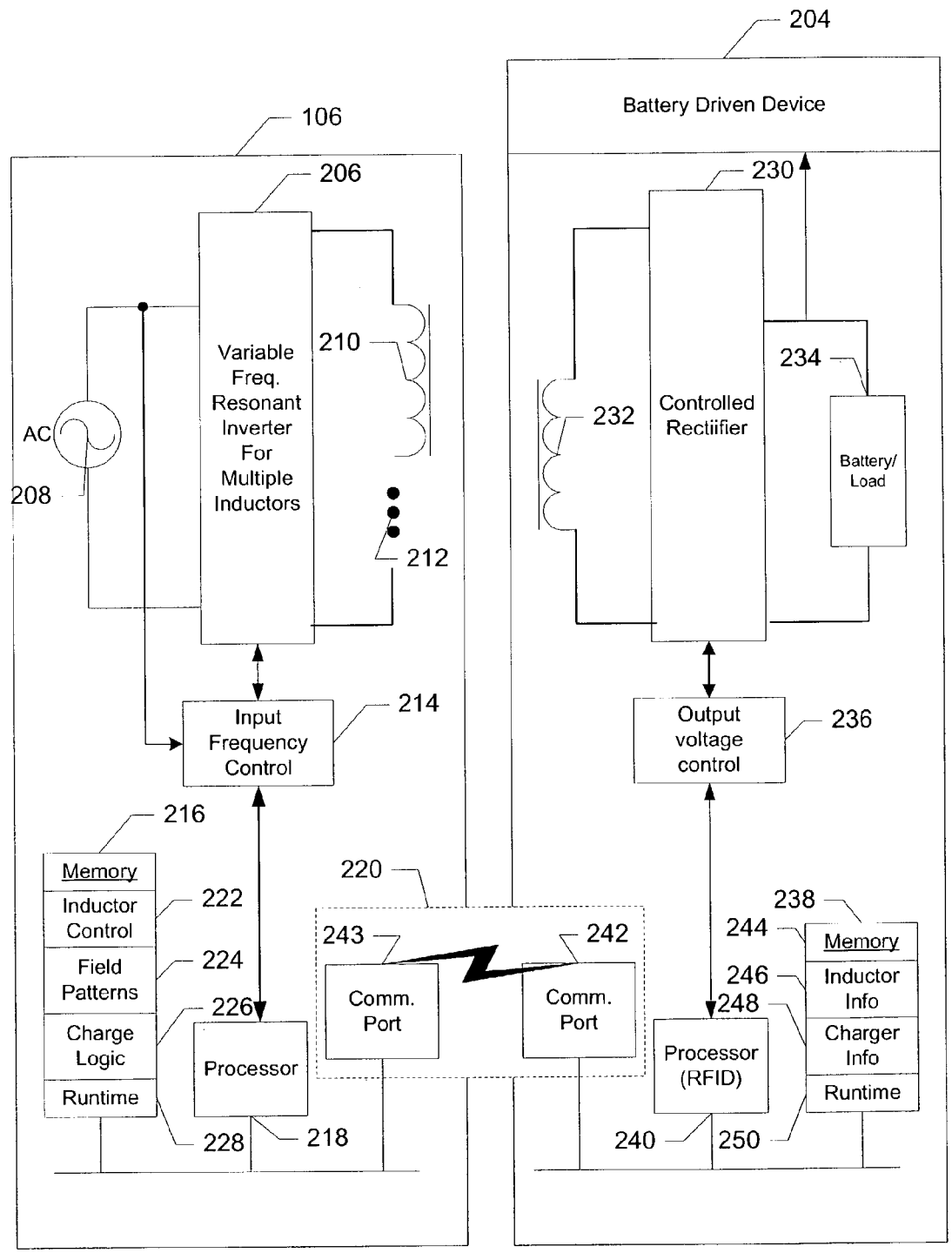
FIG. 2 provides a block diagram of an inductive charger and a device compatible with one implementation of the present invention.

FIG. 2 provides a block diagram of inductive charger 106 and a device 204 compatible with one implementation of the present invention. Inductive charger 106 includes a variable frequency resonant inverter for multiple inductors 206, a alternating current source 208, a set of inductors 210 through 212, an input frequency control 214, a memory 216, a processor 218, and a communication port 243 used to communicate over a separate data communication channel 220.

Variable frequency resonant inverter for multiple inductors, hereinafter inverter 206, senses input voltage changes over power source 208 and controls switching frequency of the inverter to provide a relatively constant power over inductors 210 through 212. Input frequency control 214 maintains an input frequency to inverter 206 as needed by the particular device and above the resonant frequency of the circuit.

Processor 218 executes instructions and programs stored in memory 216 in accordance with one implementation of the present invention. Inductor control 222 specifies the amount of power delivered to each of the two or more inductor coils used to generate magnetic fields for charging. Vector operations are calculated and used by inductor control 222 to combine the various fields provided by individual inductors 210 through 212 when charging the various devices on inductive charger 106. Different vector operations are performed depending on the geometry of the inductor coils and their relative positions to each other. Also, inductor control 222 takes into account the particular parameters used to inductively charge a device including orientation, strength, phase, amplitude, and frequency of the magnetic inductive field.

Both predetermined field patterns as well as learned patterns for the magnetic inductive field are managed and stored by field patterns component 224. In one implementation, field patterns components 224 stores predetermined profiles and parameters for charging devices designed in accordance with implementations of the present invention. Alternatively, profiles for charging certain devices are not predetermined but discovered in accordance with the present invention prior to charging and also stored in field patterns component 224. In another implementation, profiles stored in the device are transmitted to charger device 106 prior to being charged and stored in field patterns component 224.

Charge logic component 226 includes logic for charging multiple devices and determines the profiles to be used for charging each of the devices placed on inductive charger 106. In addition, charge logic component 226 processes information to determine when a particular device is fully charged or having difficulties being charged and notifies an operator or user of the same. For example, charge logic component 226 may receive signal from a device being charged indicating the charging status of the device (e.g., fully charged, no charge, or battery failure). Signals can be modulated over the charging channel or over the separate data communication channel 220. Runtime component 228 is a real-time or preemptive operating system used to manage allocation of resources and overall operation of inductive charger 106.

Device 204 includes a controlled rectifier 230, a secondary coil 232, a battery/load 234, an output voltage control 236, a memory 238, a processor (RFID) 240, and communication port 242 for communicating over data communication channel 220. Alternatively, communication port 242 can communicate charge information and status over secondary inductor 232 and through inductors 210 to 212 rather than a separate data communication channel 220.

Controlled rectifier 230 receives charge over secondary coil 232 and regulates the output in view of any load changes that may occur. To a lesser extent, controlled rectifier 230 may also regulate input voltage changes from the one or more inductors 210 through 212. Mutual inductance between secondary coil 232 and inductors 210 through 212 charges battery/load 234 when the magnetic field is provided with the proper orientation, strength, phase, amplitude, frequency and other charging parameters in accordance with implementations of the present invention.

Output voltage control 236 utilizes pulse-width modulation (PWM), voltage sensing, scaling, level shifting circuitry and other measures to ensure that processor (RFID) 240 and other components receive proper output levels. Processor (RFID) 240 optionally also has radio-frequency identification (RFID) capabilities for "tagging" device 204 and providing charging information, parameters, and charge status. In this context, processor (RFID) 240 receives commands and power from inductive charger 106 and responds by sending data, clock, and power information back over the same charging channel. Without RFID capabilities, inductive charger 106 can also determine charging information, parameters, and status of device 204 by monitoring load levels and interpreting the results.

Memory 238 in device 204 includes inductor information 246, charger information 248, and also includes a runtime 248 that manages resources on device 204. Inductor information 246 can include various technical and operational specifications of secondary inductor 232 receiving magnetic charge and generating a current. Charger information 248 includes charge history for device 204 as well as charge status, and other information useful when inductive charger 106 is charging.

Figure 3:
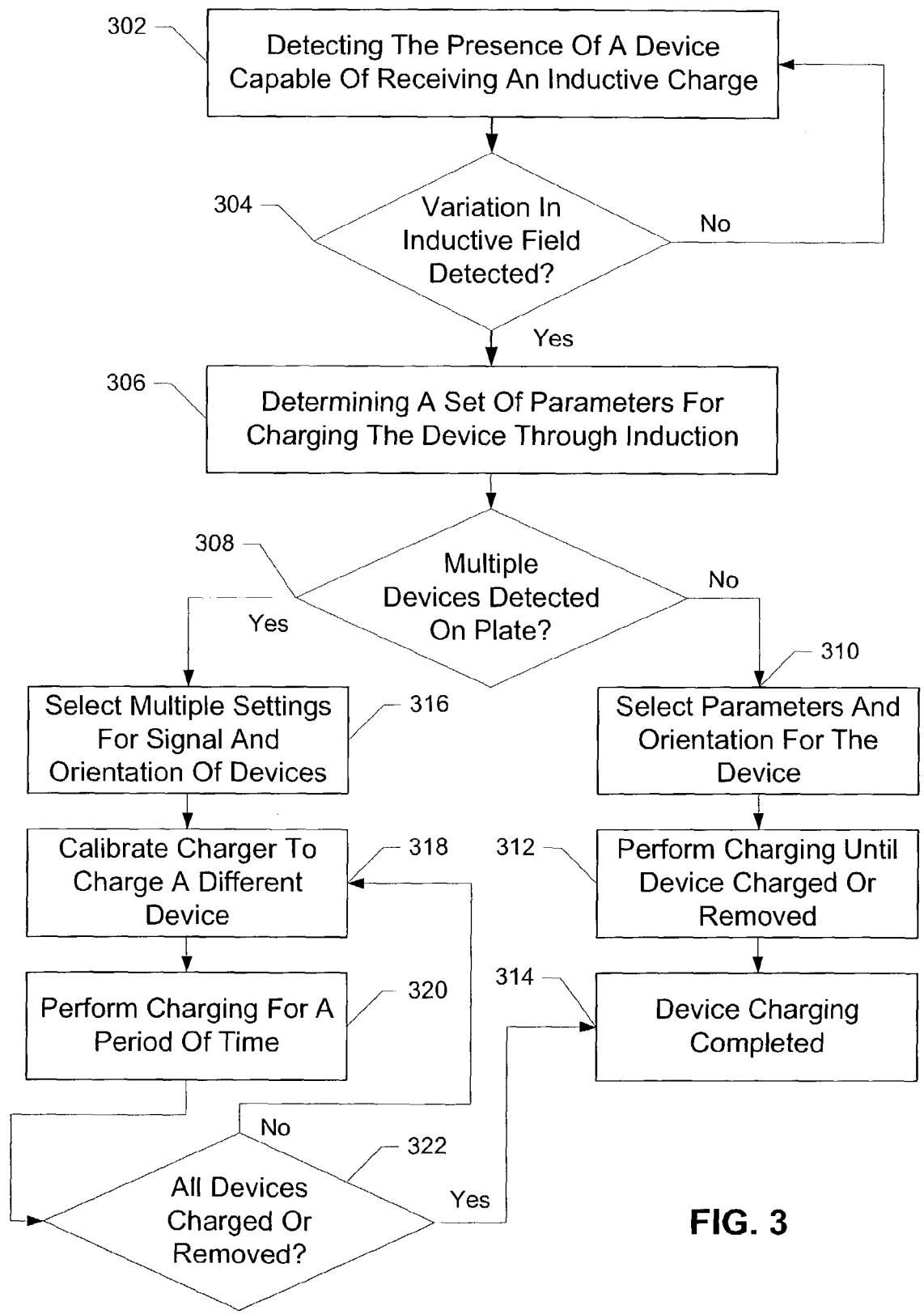
FIG. 3 is a flowchart diagram used by the inductive charger when charging one or more devices in accordance with one implementation of the present invention.

FIG. 3 is a flowchart diagram used by the inductive charger when charging one or more devices in accordance with one implementation of the present invention. Periodically, the inductive charger checks to see if one or more devices have been placed on the plate for charging (302). In one implementation, the inductive charger measures a change in the load being drawn through the inductors to determine if a device has been set on the inductive charger (304). Alternatively, an RFID tag on the device notifies the inductive charger that it needs inductive charging. The inductive charger may also receive notification that a device needs charging over a separate wireless data channel being polled by the inductive charger.

Once the one or more devices have been detected, implementations of the present invention sweep through various parameters for an array of inductors based on predetermined settings and device information. The inductive charger selects a set of parameters to best charge the device through induction (306). The parameters for charging include orientation, strength, phase, amplitude, and frequency of the magnetic inductive field. Load measurements are used to associate the combination of parameters with each detected device. For example, larger load measurement indicates greater mutual magnetic coupling between the inductive charger and a device and a more optimal combination of charging parameters.

The inductive charger operates differently depending on whether a single device or multiple devices needs charging (308). If a single device is detected, the inductive charger selects the optimal parameters and orientation for charging the device (310). These parameters activate one or more inductive coils creating a magnetic field oriented to charge the detected device. In addition, the parameters may also specify strength, phase, amplitude, and frequency of the magnetic inductive field. Using these settings, the inductive charger continues charging the device until the device is charged or removed from the proximity of the charger (312). In one implementation, the inductive charger monitors the load to determine when the device has been completely charged and then terminates the charging process (314). Alternatively, the device can transmit a signal over a separate data communication channel or over the charging channel indicating that the device has received a sufficient charge. Yet another implementation can signal a completed charge using an RFID tag embedded in the device communicating to an RFID reader within the inductive charger.

When multiple devices are detected, the inductive charger selects multiple sets of parameters and orientations for charging the multiple respective devices (316). Depending on the device receiving the charge, the inductive charger calibrates the one or more inductors and charging circuitry to deliver a magnetic field to the first device (318). These parameters activate one or more inductive coils creating a magnetic field oriented to charge the first device. Additionally, the parameters may also specify strength, phase, amplitude, and frequency of the magnetic inductive field.

The inductive charger charges the device for a fixed or variable period of time to facilitate charging multiple devices in a round-robin manner. At the end of the elapsed time interval, the inductive charger determines if the other devices still need charging or have been removed from the inductive charger (322). If one or more devices needed charging, the inductive charger then calibrates the inductive coils and circuitry for the subsequent device to be charged and continues the charging process in accordance with implementations of the present invention (318). Over time, multiple devices are charged (314) by time-sharing the inductive charger in this round-robin sharing arrangement. Alternatively, the inductive charger can charge multiple devices in a FIFO queue according to their placement on the inductive charger. Accordingly, the first device is charged in the entirety before subsequent devices receive any charge. This alternate scheme would likely charge the first device more quickly while subsequently queued devices would have to wait until each of the preceding devices in the queue completes their charging cycle.

Figure 4:
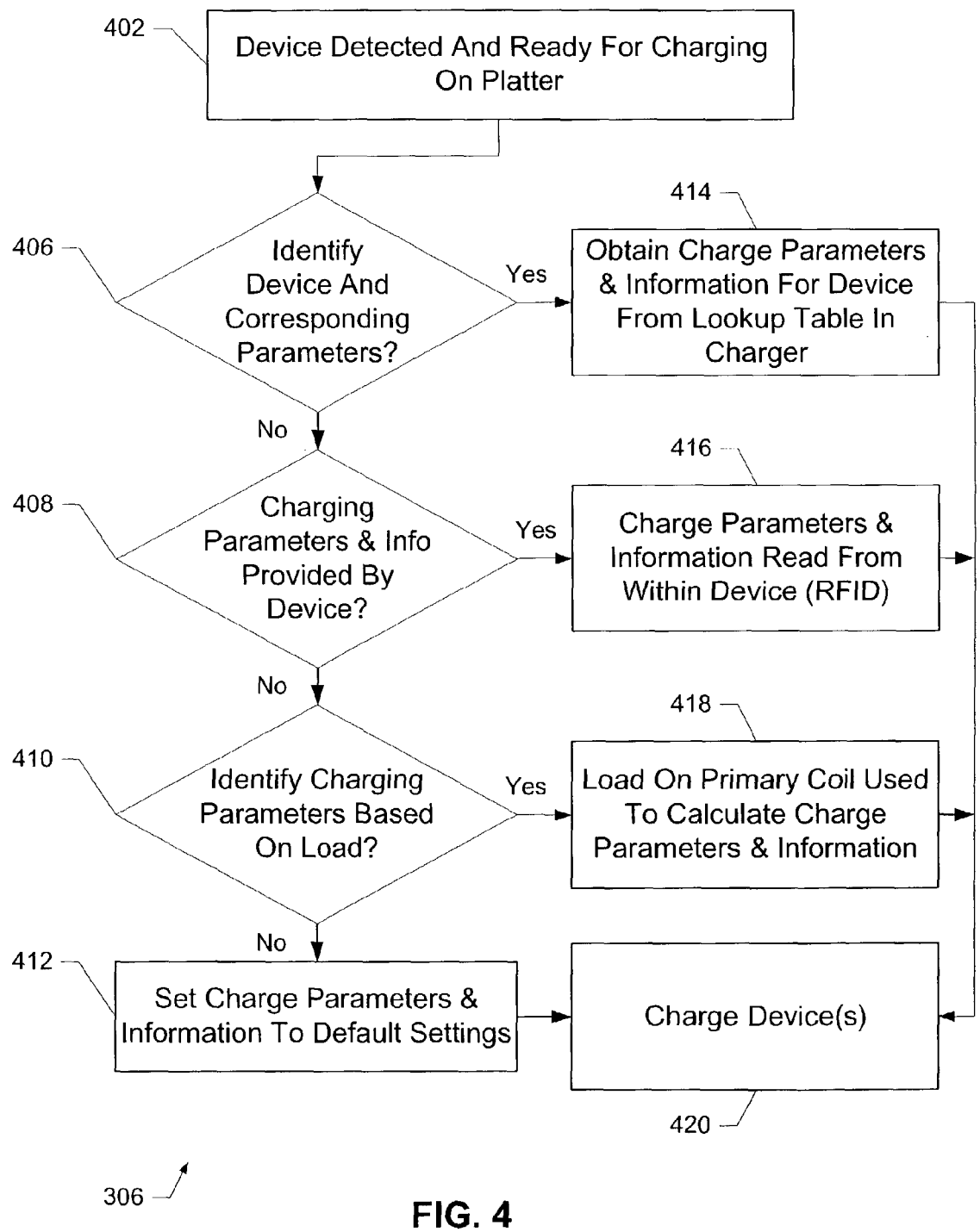
FIG. 4 is a flowchart diagram of the operations for selecting parameters and settings for the inductive charger in accordance with one implementation of the present invention.

FIG. 4 is a flowchart diagram of the operations for selecting parameters and settings for the inductive charger in accordance with one implementation of the present invention. To accommodate different devices, the inductive charger can be calibrated or setup for charging in several different ways. As previously described, the inductive charger detects presence of one or more devices before determining the charging parameters for each device (402). This can be done by detecting a sudden change in the load on the inductive charger or by monitoring the charging or data communication channel for a device requesting a charge. In one implementation of the present invention, the device is designed in accordance with the present invention and is registered in advance with the inductive charger. Accordingly, if the inductive charger recognizes and uniquely identifies the parameters associated with the device (406), charging parameters and information for the device can be obtained from a look-up table (LUT) embedded within the inductive charger. An RFID tag may transmit the device model and type enabling the inductive charger to then determine the optimal charging parameters for the device in the locally stored LUT.

Alternatively, the inductive charger can receive charging parameters and information transmitted from the device (408). The RFID tag on a device designed in accordance with the present invention can include the appropriate charging parameters and information for the device. This RFID tag transmits the information to the RFID reader associated with the inductive charger (416) which, in turn, uses the information to calibrate the inductive coils and circuitry for charging the particular device.

Yet another alternative, the inductive charger monitors the load to determine the appropriate parameters and charging information for the particular device (410). As previously described, the inductive charger cycles through various combinations for calibrating the inductive coils and circuitry to determine the most optimal setting (418). For example, a larger load would indicate greater mutual inductive coupling and more efficient charging between the inductive charger and the device. In each of the above examples of calibrating by a look-up table (414), RFID tag information (416), or measuring load characteristics (418), implementations of the present invention also try different orientations of the magnetic field before charging the device (420).

FIG. 5 is a block diagram illustrating various geometric configurations for arranging inductive coils in accordance with implementations of the present invention. Square configuration 502, round configuration 504, and polygon 506 are example geometric arrangements of the inductive coils for use with the present invention. Each geometric configuration of inductive coils produces different magnetic fields during charging calculated using vector operations. In square configuration 502, up to four vectors can be used when determining the magnetic field produced by each of the four inductive coils as illustrated. For example, a resultant vector $\vec{R}$ is produced by the vector combination of $\vec{A}+\vec{B}+\vec{C}+\vec{D}$ vectors. Alternatively, square configuration 502 could also use only two vectors and resultant vector $\vec{R}$ would be calculated from a pair of orthogonal vectors $\vec{A}+\vec{B}$ or $\vec{C}+\vec{D}$.

Round configuration 504 includes many more coils and can be used for a wider range of charging conditions including improved control over the orientation of the magnetic field. In this example, resultant vector $\vec{R}$ is produced by the vector combination of $\vec{A}+\vec{B}+\vec{C}+\vec{D}+\vec{E}+\vec{F}+\vec{G}+\vec{H}+\vec{I}+\vec{J}$ vectors. Alternatively, fewer or greater inductive coils and corresponding vectors could be used in round configuration 504. Similarly, polygon 506 represents a geometric configuration having more sides than square 502 and fewer than perhaps round configuration 504. In this implementation, the resultant vector $\vec{R}$ is produced by the combination of $\vec{A}+\vec{B}+\vec{C}+\vec{D}+\vec{E}+\vec{F}+\vec{G}+\vec{H}$ vectors. Yet other implementations of the present invention could combine inductive coils in geometric shapes that are asymmetric, non-regular, contain fewer than four sides, and circumscribe or surround other predetermined shapes in two-dimensional or three-dimensional space. For example, inductive coils can be positioned relative to each other in obtuse angles, acute angles, or combinations thereof in two-dimensional or three-dimensional configurations.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

Furthermore, while specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A method of adaptively charging a device, comprising:
   detecting the presence of a device capable of receiving an inductive charge;
     determining a set of parameters for charging the device through induction,
   wherein the determined set of parameters affects an amount of power on a primary coil that provides the inductive charge; and
     transmitting the inductive charge from the primary coil to the device for charging the device, wherein determining a set of parameters includes
     varying combinations of the parameters for charging the device during a time interval;
     measuring a load of the device for each of the various combinations of the parameters; and
     selecting one of the various combinations of the parameters based on the measured load of the device.

2. The method of claim 1 further comprising,
   terminating the transmission of the inductive charge once the device is adequately charged.

3. The method of claim 2 wherein the terminating further comprises:
   receiving a signal from the device identifying a level of charge; and
   determining the device has completed charging based on the level of charge identified.

4. The method of claim 3 wherein the signal causes a change in the load over a same channel used to charge the device.

5. The method of claim 3 wherein the signal is transmitted over a signal channel separate from a channel used to charge the device.

6. The method of claim 3 wherein the signal is transmitted from the device using radio frequency identification device (RFID) compatible technology.

7. The method of claim 1 wherein the primary coil includes a set of two or more induction coils positioned at different angles from each other.

8. The method of claim 1 wherein selecting one of the various combinations of the parameters includes selecting a combination of the parameters that provides a largest load in the primary coil.

9. The method of claim 8 wherein at least one of the parameters is selected from a set of parameters including a phase, an amplitude, and a frequency of an inductive field.

10. The method of claim 1 wherein the set of parameters determined to charge the device is set according to a lookup table (LUT) with predetermined parameters for a particular device.

11. The method of claim 1 wherein the device provides the set of parameters to be used for charging the device.

12. The method of claim 1 wherein the device provides the set of parameters over a charging channel using a radio-frequency identification device (RF-ID).

13. The method of claim 1 wherein the device provides the set of parameters using a communication link separate from a channel used to charge the device.

14. A method of charging a device through mutual inductance:
   combining at least two inductive fields created by two or more inductive coils positioned at different angles from each other;
   delivering the combined inductive field at an orientation to the device;
   measuring a load of the device to determine an effectiveness of the orientation of the combined inductive field on the device; and
   charging the device at the orientation of the combined inductive field when the measured load of the device exceeds a threshold load level.

15. The method of claim 14 further comprising:
   charging additional devices at different orientations of the combined inductive field when the measured load of each of the additional devices exceeds the threshold load level.

16. The method of claim 14 wherein the at least two inductive fields are combined using vector operations.

17. The method of claim 14 wherein the angles between the inductive coils are obtuse.

18. The method of claim 14 wherein the angles between the inductive coils are acute.

19. The method of claim 14 wherein the threshold load level is selected such that the device is fully charged within a predetermined time interval.

20. A computer program product, tangibly stored on a computer-readable medium, for adaptively charging a device, comprising instructions operable to cause a programmable processor to:
    detect the presence of a device capable of receiving an inductive charge;
    determine a set of parameters for charging the device through induction, wherein the determined set of parameters affects an amount of power on a primary coil that provides the inductive charge; and
    transmit the inductive charge from the primary coil to the device for charging the device,
    wherein determining a set of parameters includes
        varying combinations of the parameters for charging the device during a time interval;
        measuring a load of the device for each of the various combinations of the the parameters; and
        selecting one of the various combinations of the parameters based on the measured load of the device.

21. A computer program product, tangibly stored on a computer-readable medium, for charging a device through mutual inductance, comprising instructions operable to cause a programmable processor to:
    combine at least two inductive fields created by two or more inductive coils positioned at different angles from each other;
    deliver the combined inductive field at an orientation to the device;
    measure a load of the device to determine an effectiveness of the orientation of the combined inductive field on the device; and
    charge the device at the orientation of the combined inductive field when the measured load of the device exceeds a threshold load level.

22. An apparatus that inductively charges one or more devices, comprising:
    a sensor that receives signals indicating a charge level of the one or more devices;
    a primary coil including a set of two or more induction coils positioned at different angles and capable of charging the one or more devices through mutual inductance;
    a power source designed to deliver energy to the set of two or more induction coils and create an inductive field at different orientations to the one or more devices;
    a memory having parameters for controlling the inductive field of the two or more induction coils; and
    a processor that selectively combines the parameters and delivers the parameters to the power source for control of the two or more induction coils,
    wherein the processor selectively combines the parameters by
        varying combinations of the parameters for charging the one or more devices during a time interval;
        measuring a load of the one or more devices for each of the various combinations of the parameters; and
        selecting one of the various combinations of the parameters based on the measured load of the one or more devices.

23. The apparatus of claim 22 further comprising:
    a communication port that exchanges charging information and status with the one or more devices over a communication channel separate from a charging channel.

24. The apparatus of claim 22 further comprising:
    a load sensor that monitors the load when charging the one or more devices and determines when at least one of the one or more devices has completed charging based on information modulated through a variation in the load characteristic by the one or more devices.

25. An apparatus for adaptively charging a device, comprising:
    means for detecting a presence of a device capable of receiving an inductive charge;
    means for determining a set of parameters for charging the device through induction wherein the determined set of parameters affects an amount of power on a primary coil that provides the inductive charge; and
    means for transmitting the inductive charge from the primary coil to the device for charging the device,
    wherein determining a set of parameters includes
        measuring a load of the device for each of the various combinations of the parameters; and
        selecting one of the various combinations of the parameters based on the measured load of the device.

26. An apparatus for charging a device through mutual inductance, comprising:
    means for combining at least two inductive fields created by two or more inductive coils positioned at different angles from each other;
    means for delivering the combined inductive field at an orientation to the device;
    means for measuring a load of the device to determine an effectiveness of the orientation of the combined inductive field on the device; and
    means for charging the device at the orientation of the combined inductive field when the measured load of the device exceeds a threshold load level.

* * * * *

UNITED STATES PATENT AND TRADEMARK OFFICE
CERTIFICATE OF CORRECTION

Page 1 of 1

PATENT NO. : 8,183,827 B2
APPLICATION NO. : 10/353540
DATED : May 22, 2012
INVENTOR(S) : Geoff M. Lyon It is certified that error appears in the above-identified patent and that said Letters Patent is hereby corrected as shown below:

In column 9, line 18, in Claim 20, after "of" delete "the".

In column 10, line 26, in Claim 25, delete "induction" and insert -- induction, --, therefor.

In column 10, line 32, in Claim 25, above "measuring a load of the device"
insert -- varying combinations of the parameters for charging the device during a time interval; --.

Signed and Sealed this
Eleventh Day of December, 2012

David J. Kappos
*Director of the United States Patent and Trademark Office*